United States Patent

Hessman et al.

[11] Patent Number: 5,957,629
[45] Date of Patent: Sep. 28, 1999

[54] FINE MILLING CUTTING INSERT

[75] Inventors: Ingemar Hessman; Stefan Roman, both of Sandviken, Sweden

[73] Assignee: Sandvik AB, Sandviken, Sweden

[21] Appl. No.: 08/669,538

[22] PCT Filed: Jan. 13, 1995

[86] PCT No.: PCT/SE95/00033

§ 371 Date: Sep. 6, 1996

§ 102(e) Date: Sep. 6, 1996

[87] PCT Pub. No.: WO95/19238

PCT Pub. Date: Jul. 20, 1995

[30] Foreign Application Priority Data

Jan. 14, 1994 [SE] Sweden .................................. 9400081
Sep. 6, 1994 [SE] Sweden .................................. 9402983

[51] Int. Cl.⁶ ..................................................... B32B 27/16

[52] U.S. Cl. ............................................. 407/113; 407/42

[58] Field of Search ............................... 407/34, 42, 113, 407/40, 36, 53, 61, 114

[56] References Cited

U.S. PATENT DOCUMENTS

| | | | |
|---|---|---|---|
| 3,955,259 | 5/1976 | Gustagsson | 407/113 |
| 5,020,944 | 6/1991 | Pawlik . | |
| 5,190,418 | 3/1993 | Nakayama et al. . | |
| 5,244,318 | 9/1993 | Arai et al. | 407/113 |
| 5,256,009 | 10/1993 | Stoffels . | |
| 5,586,645 | 12/1996 | Arai et al. | 407/113 |

FOREIGN PATENT DOCUMENTS 2 119 187   9/1994   Canada .
0 370 494   11/1989   European Pat. Off. .

*Primary Examiner*—Andrea L. Pitts
*Assistant Examiner*—Mark Williams
*Attorney, Agent, or Firm*—Burns, Doane, Swecker & Mathis, L.L.P.

[57] ABSTRACT

A double-sided milling cutting insert has two parallel main surfaces which are turned 90° relative to each other. Each main surface comprises four operative cutting corners. In each cutting corner there are two bevelled surfaces which are angled relative to the plane of the main surface. Four side surfaces are angled in order to make possible a positive cutting geometry.

5 Claims, 3 Drawing Sheets

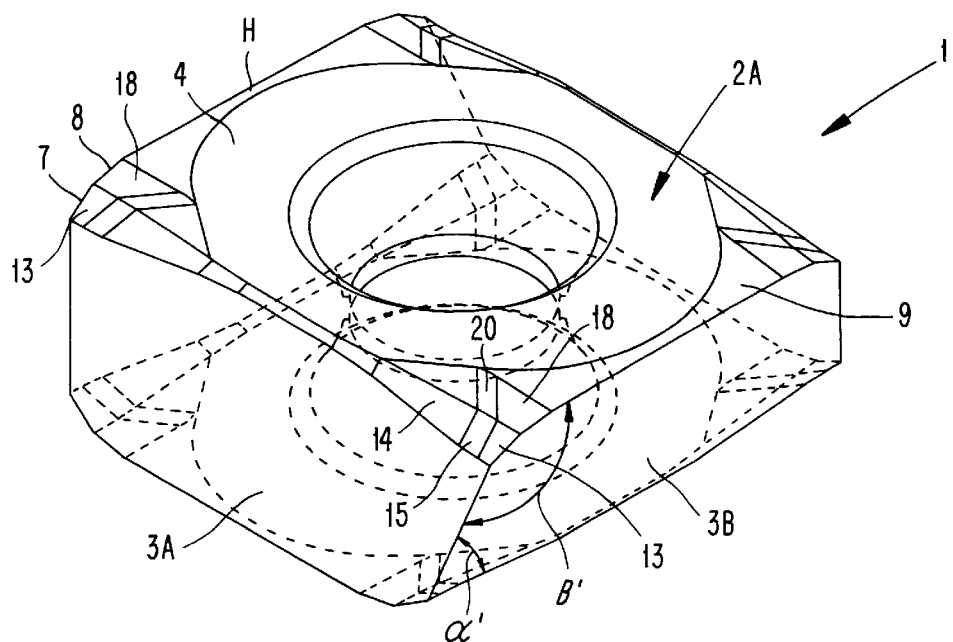
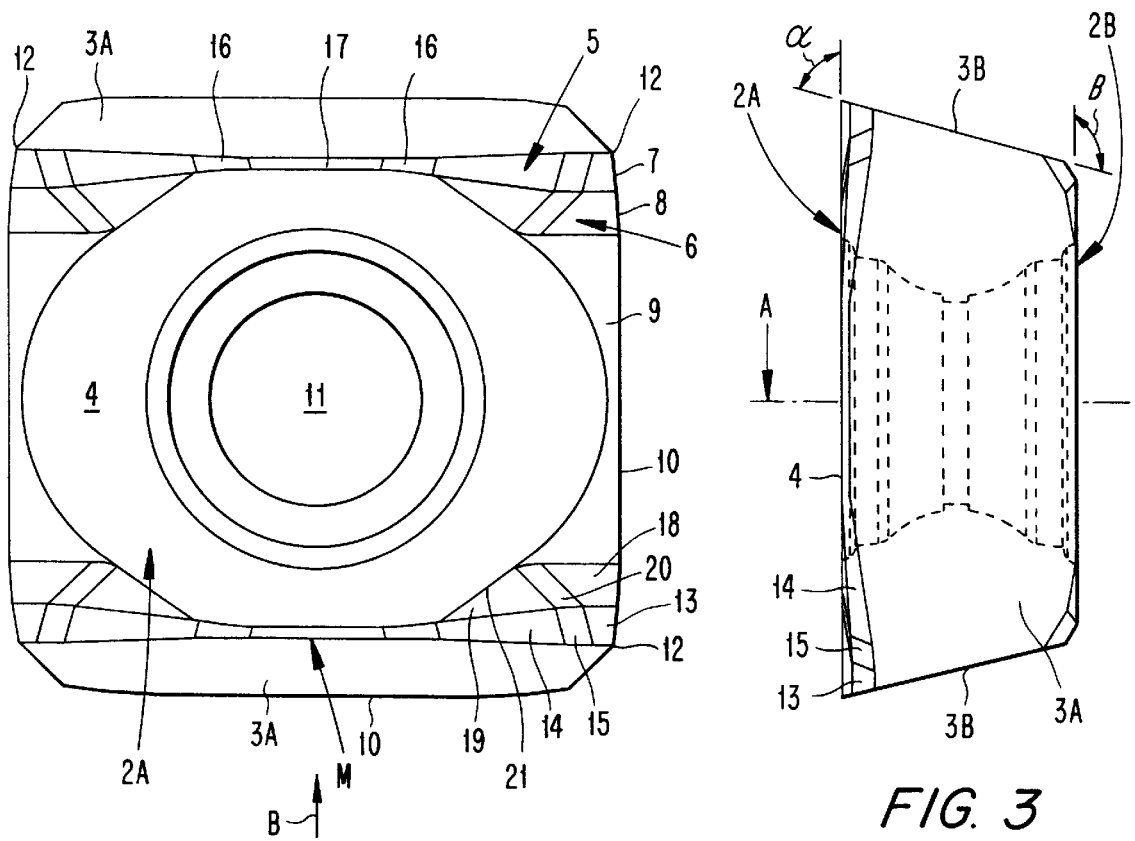

FINE MILLING CUTTING INSERT

BACKGROUND OF THE INVENTION

The present invention relates to a double-sided milling cutting insert for fine machining, which is made by form-pressing and sintering of a powder that constitutes a cutting insert material and comprises two substantially similar main surfaces, which are turned by 90° relative to each other, and four substantially similar side surfaces that extend between these main surfaces.

Such milling cutting inserts are fastened in a way known per se in rotative milling tools. Usually, this fastening is made on insert-carrying cassettes, as for instance described in the Swedish patent application 9300889-4 and in DE-A-4 013 717. In order to achieve the required surface smoothness of the workpiece, it is necessary to locate the cutting insert as exactly as possible in the desired position, particularly in the axial direction. If the axial positioning is unsatisfactory, then so called axial play arises, which causes a deteriorated surface smoothness of the workpiece.

In for instance the motor industry, close pitch milling cutters are used for the milling of engine blocks, cylinder blocks and similar parts. For those applications, very high requirements are set for surface smoothness and $R_a$-values of maximally 1.5 μm, $R_z$-values of between 10 and 15 μm and WT-values, of between 5 and 8 μm are often required. It has been possible to attain those tolerances by the construction described in the above mentioned Swedish patent application.

A problem that often arises in fine milling applications is the creation of so called edge chippings, i.e., chips are torn off from the periphery of the produced surface when it is being machined. Of course, edge chippings may also occur around the edges of recesses on the machined surface, such as around the edge of a boring.

Another problem often arises during the milling of thin-walled workpieces. As is known, for the sake of saving material and weight, certain parts of a workpiece may be relatively thin-walled, such as between 3 and 5 mm. These thin portions tend to yield to some extent to the pressure from the milling tool, which in turn results in a certain waviness on the produced surface.

A further problem with several of the fine milling cutting inserts on the market is the fact that they to a high degree require a costly precision grinding in order to attain the highly set tolerance requirements. Of course, this increases the production costs most considerably. As an example of this, one may again mention DE-A-4 013 717, and the known cutting insert reproduced in FIG. 7. Another inconvenience of the inserts disclosed in DE-A-4 013 717 is that they are slightly rhombic. This has the consequence that only two of the four corners on each side may become operatively active. Thus, this disadvantage doubles the already previously considerable production cost per cutting corner.

Thus, a first object of the present invention is to provide a milling cutting insert that reduces the size and the number of edge chippings to a minimum.

A second object of the present invention is to achieve fine and smooth surfaces also on thin-walled workpieces.

Still another object of the present invention is to reduce the axial pressure of the milling tool against the workpiece.

A still further object of the present invention is to minimize the costs for the production of the milling cutting insert.

SUMMARY OF THE INVENTION

These and further objects have been achieved in a surprising way by forming a milling cutting insert with the second main surface (2B) including a planar support face (4), four cutting corners (12) and a pair of first and second beveled faces (5, 6) disposed in each cutting corner, each of the first and seond beveled faces (5, 6) of the second main surface (2B) being angled relative to a plane of the second main surface, the first beveled face (5) of the second main surface (2B) being disposed closer to a respective cutting corner than is the second beveled face (6) of the second main surface (2B), the first beveled face (5) of the second main surface (2B) bordering one of the first side surfaces (3B) and intersecting one of the second side surfaces (3A) to form a secondary cutting edge (7) therewith the second beveled face (6) of the second main surface bordering the first beveled face and intersecting the same second side surface (3A) as the first beveled surface to form therewith a main cutting edge.

BRIEF DESCRIPTION OF THE DRAWING

For illustrative but non-limiting purposes, the invention will be described in more detail with reference to the appended drawings which show preferred embodiments.

FIG. 1 shows a perspective view obliquely from above of a cutting insert according to the invention.

FIG. 2 shows a top view of the cutting insert according to FIG. 1.

FIG. 2A is a fragmentary side elevational view of one side of the insert of FIG. 1.

FIG. 3 shows a side view of the cutting insert taken in the direction of arrow B in FIG. 1.

FIG. 5A is a fragmentary side view of one side of the insert shown in FIG. 4.

DETAILED DESCRIPTION OF PREFERRED EMBODIMENTS OF THE INVENTION

Figure 4:
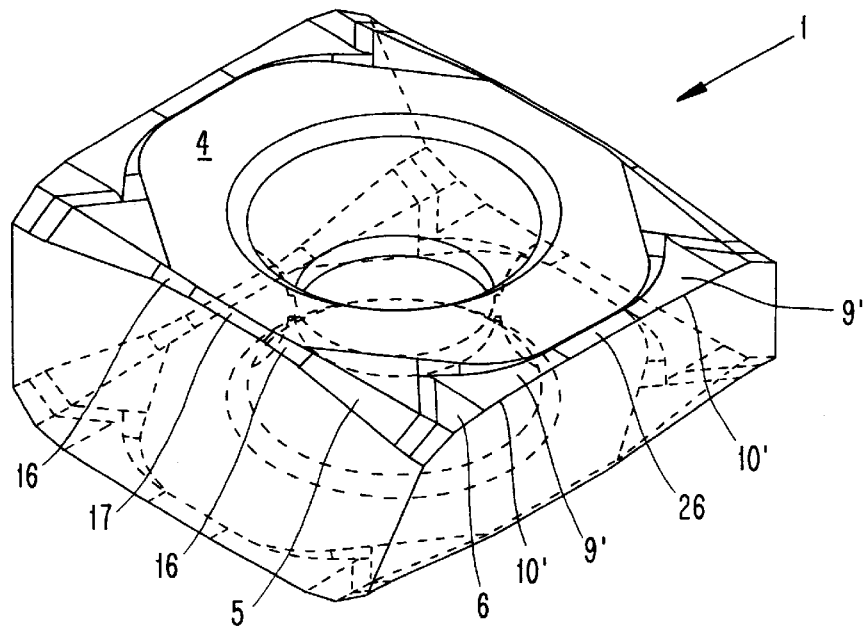
FIG. 4 shows another embodiment of a cutting insert according to the invention.

In FIGS. 1 to 3 and 4 to 6, respectively, an indexable cutting insert of square basic shape is illustrated which in its entirety is designated by reference numeral 1. It is double-sided and has two similar main surfaces 2A, 2B, which are substantially parallel to each other and are turned 90° relative to each other about a center axis A. Between the two main surfaces 2 of the insert extend four substantially identical side surfaces 3A, 3B. In order to confer a positive cutting geometry to the cutting insert when it is mounted in the milling cutter body (see FIG. 8), two side surfaces 3B opposed to each other are inclined in such a way that they form an acute angle with the main surface 2A. Suitably, this angle can lie within the range of 60 to 85°, preferably between 70 and 80°. Each of the other side surfaces 3A forms an obtuse angle B' with that main surface 2A (see FIG. 1). Likewise, the side surfaces 3B form obtuse angles B with the other main surface 2B (see FIG. 3), and the side surfaces 3A form acute angles ' with the main surface 2B (see FIG. 1).

Each main surface essentially consists of an abutment surface 4, which is planar and functions as an abutment surface against the corresponding support surface in the insert pocket of the milling cutter body. An essential feature of the present invention is that at each cutting corner there are two beveled surfaces 5 and 6. The surface 5 extends substantially along the adjacent edge surface 3A. The other beveled surface 6 extends along the inside edge of the surface 5. The beveled surface 5 may extend from one corner 12 to next corner 12, as illustrated in FIGS. 1 and 2; however, it may also be interrupted into two-separate areas by the support surface 4 extending the whole way to the two edge surfaces 3A. Further, each corner portion of the beveled surface 5 that directly adjoins the beveled surface 6 may be divided into three facet surfaces 13, 14, 15 in order to increase the clearance when the insert is mounted in a milling cutter body. Thus, said portion may be divided into two plane facet surfaces 13 and 14, which connect to each other via a concave radiused facet 15. Facet surface 13 occupies a constant level difference relative to the plane of support surface 4 (i.e., facet surface 13 is parallel to surface 4), while facet surface 14 is inclined upwardly towards said plane. The width of surface 14 is diminishing in the direction towards the middle M of the insert's side 3A. The narrower end of facet surface 14 transposes via a convex radius 16 into a planar portion 17, which is substantially parallel with the support surface 4 and located on a level somewhat below the plane of the support surface 4. If support surface 4 were to extend to the very edge surface 3, of course the portions 16 and 17 would not exist.

In the same way as beveled surface 5, also beveled surface 6 may be divided into two facet surfaces 18 and 19, which are interconnected via a concave radius transition facet 20. Also in this case, the reason for this division into facets is to increase the clearance of the part of the beveled surface that is situated next to the cutting edge. In the same way as facet surface 13, facet surface 18 is disposed at a constant distance from the plane of the support surface 4, while facet surface 19 is inclined upwardly towards said plane to connect to said support surface 4 along a break-line 21.

The beveled surface 5 located at the cutting corner is adjacent to the edge surface 3A along a secondary cutting edge 7, whose primary function is to impede edge chippings. In order to fulfil this function, the angle between facet surface 13 and the plane of the support surface 4 should be within 5 and 45°, suitably between 10 and 40° and preferably between 25 and 35°.

As mentioned above, beveled surface 6 is situated next to beveled surface 5. The angle of facet surface 18 to the support surface 4 is between 1 and 20°, suitably between 3 and 17° and preferably between 5 and 15°. The beveled surface 6 connects to the adjacent edge surface 3B along a main cutting edge 8.

Figures 5, 6:
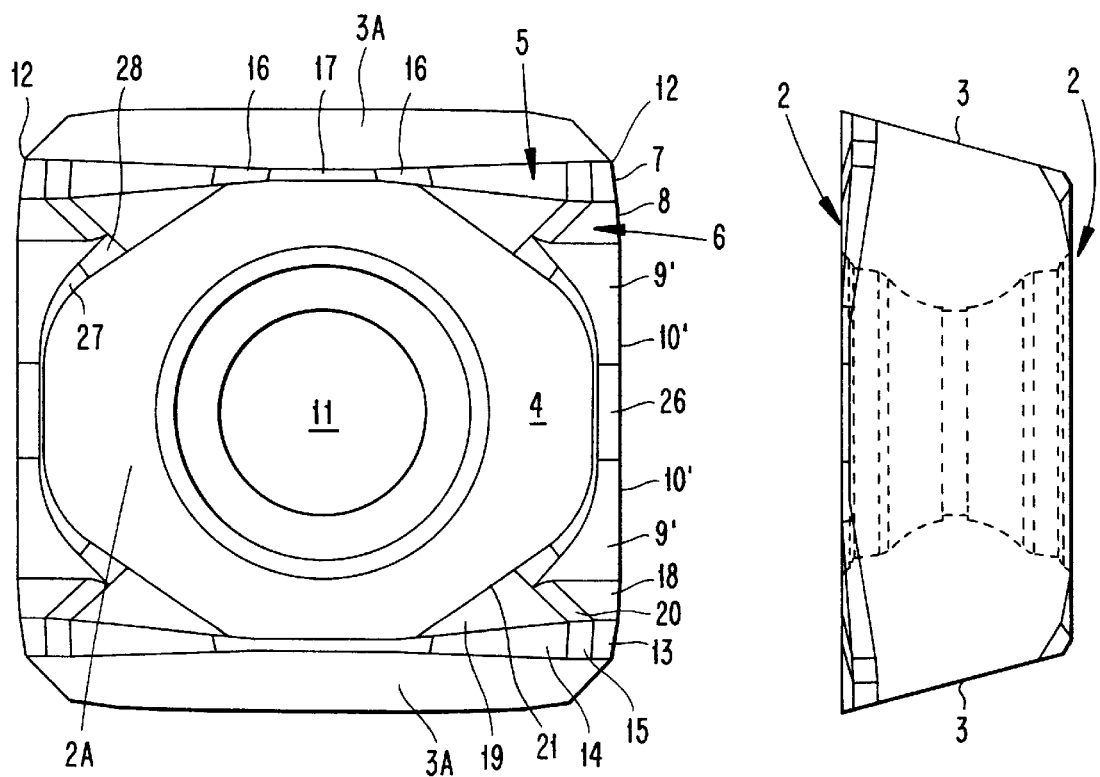
FIG. 5 shows a top view of the cutting insert according to FIG. 4.
FIG. 6 shows a side view of the cutting insert taken in the direction of arrow B' in FIG. 4.

Referring now to another embodiment depicted in FIGS. 4 to 6, there is depicted an insert 100 wherein two lands 9' extend between two adjacently located ones of the beveled surfaces 6, which lands also adjoin respective parallel land cutting 10'. A middle face 26 is located between said lands 9'. Usually the lands 9' and the middle face 26 are situated somewhat lower than support surface 4, wherefore transposition surfaces 27 and 28 are arranged between the lands and the middle portion on the one hand and the support surface 4 on the other hand. Each land 9' has a slight bend or curvature perpendicularly to the support surface 4.

According to the embodiment shown in FIGS. 1 to 3, a land 9 extends between two adjacent beveled surfaces 6, which land also adjoins a land cutting edge 10 and the support surface 4. The land 9 has a slight bend or convex curvature perpendicularly to the support surface 4 (see FIG. 2A). The radius of this curvature is rather large and according to the embodiment shown in FIGS. 1 to 3 it may suitably be between 500 and 1200 mm, preferably between 600 and 1000 mm. According to the embodiment shown in FIGS. 4 to 6, the corresponding radius of curvature of the lands 91 may suitably be between 20 and 600 mm, preferably between 70 and 400 mm (see FIG. 5A). The highest points of the curved parallel lands 9' are located above the middle face 26, however preferably below the support surface 4, in order to simplify the production of the insert seats in the milling cutter body. Since the land cutting edges 10, 10' are very short in comparison with the directly pressed radii (cutting edge 10 is suitably between 6 and 8 mm, each edge 10' suitably between 1.8 and 3.2 mm), the chordal height of the land cutting edge becomes correspondly small. For example, for a cutting edge 10', it is within the range 3 to 7 $\mu$m, and for the edge 10 within the range 6 to 10 $\mu$m. The highest point of the land cutting edge is at its middle, where the secondary land 9 has its smallest width. However, it does not fully reach up to the plane of support surface 4. Suitably, there is a step of between 2 and 100 $\mu$m between the highest point H of the land 9 and the support surface, preferably between 5 and 35 $\mu$m. These measures are also valid for the vertical distance between the middle portion 26 and the support surface 4.

Due to the curved lands and the bevel-strengthened corners, no grinding of these surfaces is necessary for achieving the desired surface smoothness on the workpiece. The only surfaces that may require an after-grinding in order to attain exact positioning in the insert seats with a minimal radial play, are edge surfaces 3A, 3B. The main surfaces or clearance surfaces 2A can be directly pressed in their entirety, "main surface" or "clearance surface" meaning the entirety of surfaces 4, 5, 6, 9, 16 and 17 (FIG. 2), and 4, 5, 6, 9', 10', 26, 27, 28 (FIG. 5). However, edge surfaces 3A, 3B are easy to grind since they are wholly planar and have fully open ends. By the simplified production, the production costs have been brought down to about a fifth of those that arise when producing cutting inserts according to DE-A-4 013 717. Even so, it has been managed to bring down the radial play to between 0.01 and 0.02 mm. This may be compared with the radial play in DE-A-4 013 717 and of the cutting insert according to FIG. 4, where it amounts to about 0.1 mm.

Figure 8:
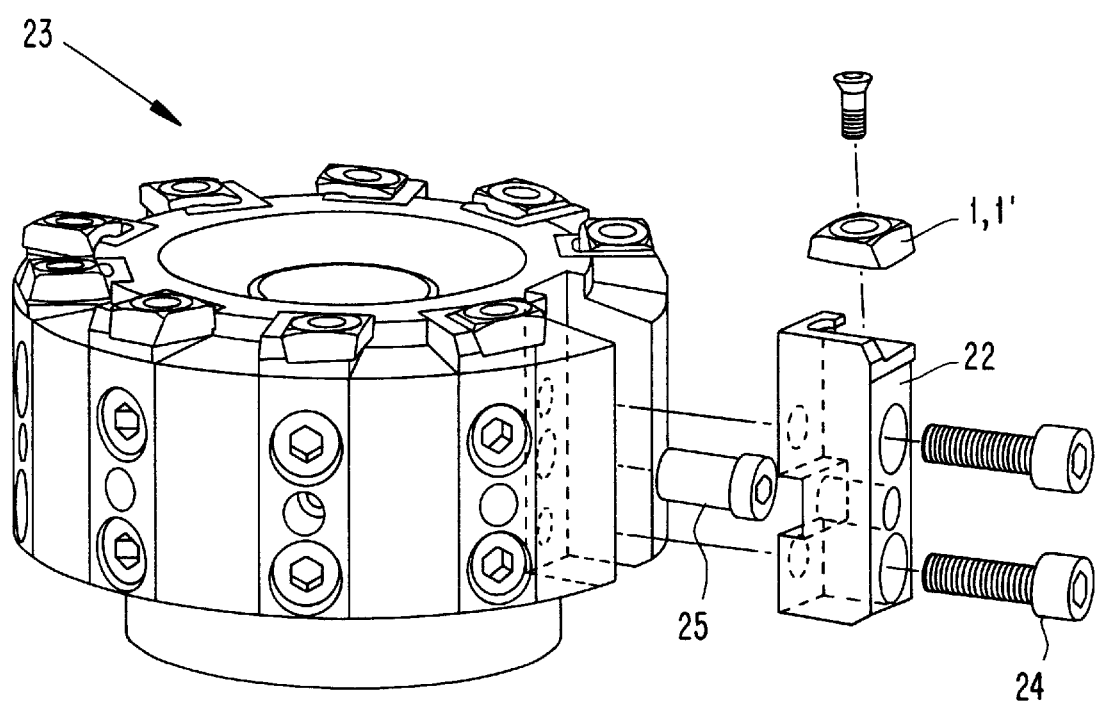
FIG. 8 shows how the cutting insert according to the invention is mounted in a milling cutter body according to the Swedish patent application 9300889-4.

Suitably, the cutting inserts according to the invention are provided with a centrally located through-hole 11 for the insertion of a suitable fastening device, such as a screw, locking pin or similar, see FIG. 8.

Returning to FIG. 7, this Fig. illustrates a known cutting insert 1'. Similarly to the present invention, the main or relief surfaces 2' are parallel and turned 90° relative to each other. Said surfaces 2' are joined via four substantially equal side surfaces 3', which are angled to the surfaces 2' in the way described above. Further, the side surfaces 3A', 3B are slightly curved outwards. A beveled surface 5' is provided between main surface 2' and each side surface 3A'. This beveled surface is angled at about 30° relative to the continuation of the plane of the main surface 2'.

FIG. 8 shows a milling cutter body according to the Swedish patent application 9300889-4. According to the invention, the cutting inserts 1, 100 are fastened in the cassettes 22, which in turn are mounted in grooves in the milling cutter body 23 by fastening screws 24. The screws 24 extend through holes in the cassettes, the holes being elongated to permit the height of the cassettes to be adjusted within the grooves, e.g., by an eccentric tap 26.

In spite of the apparent simplicity of the cutting inserts according to the invention, a number of surprising advantages have been attained. Thus, the occurrence of edge chippings has been reduced quite considerably. This is clearly illustrated in the following examples:

EXAMPLE 1

A series of equal details (engine blocks of cast iron) were submitted to a fine milling operation. The fine-milled surfaces had a number of borings, such as 80 mm cylinder holes and 15 mm holes for cooling water. The used milling cutter body was of the configuration as described in the above mentioned Swedish patent application, had a diameter of 250 mm and was in both tests fully mounted with 30 cutting inserts in the 30 existing insert seats. During both tests, the following cutting data were used:

Cutting speed: 157 m/min
Feed per insert: 0.22 mm
Cutting depth: 0.5 mm

In the first test, cutting inserts were used according to FIG. 4 and in the second test cutting inserts were used according to FIGS. 1–3.

|  | Test 1 | Test 2 |
| --- | --- | --- |
| Size of edge chippings after 1000 work pieces | 0.8–0.9 mm | 0.4 mm |
| Size of edge chippings after 2189 work pieces | unusable | 0.8 mm |

Thus, this example shows the superiority of the cutting insert according to the invention for avoiding edge chippings, in comparison with a similar known insert.

Figure 7:
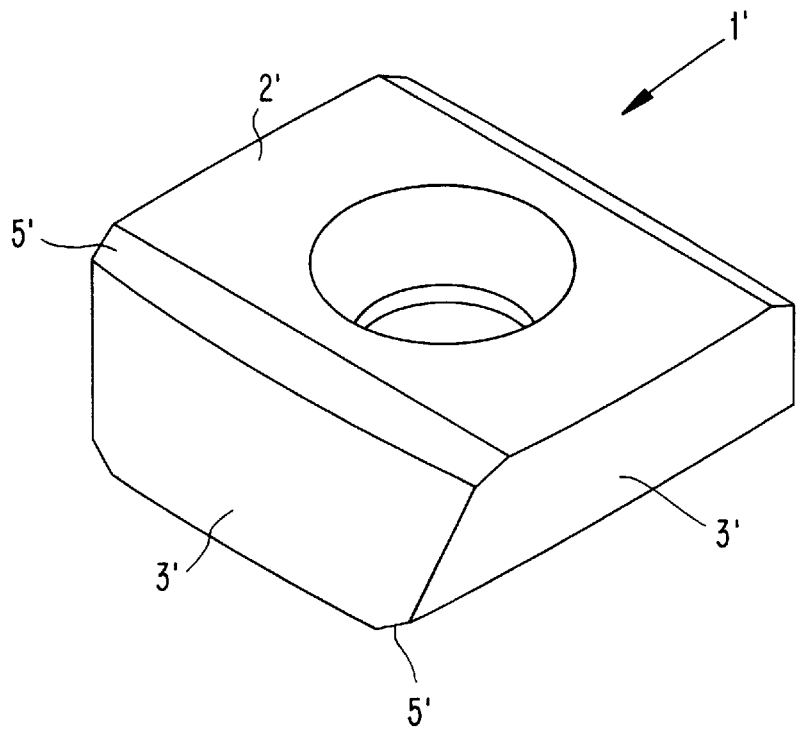
FIG. 7 shows a prior art insert in a perspective view obliquely from below.

Also tests-with cutting inserts according to the FIGS. 4 to 6 resulted in considerably fewer and smaller edge chippings than the insert according to FIG. 7, with otherwise the same process parameters.

Further, by the provision of totally eight operative cutting inserts, the insert has a very high functional level to a low production cost. Moreover, by its symmetrical form, it can be used both on right-hand and left-hand rotating milling cutter bodies.

EXAMPLE 2

Comparative measurements were also undertaken between a cutting insert according to FIG. 7 and a cutting insert according to the present invention (the embodiment shown in FIGS. 4 to 6) with regard to the magnitude of the arisen axial forces when machining cast iron. The same milling cutter body and the same cutting depth (0.5 mm) were used as in Example 1. The cutting speed was 150 m/min. The axial force arising at each test was measured and the results are presented below:

| Tooth feed | Test 1 (Invention) | Test 2 (FIG. 7) |
| --- | --- | --- |
| 0.1 mm/tooth | 35 N | 145 N |
| 0.2 mm/tooth | 100 N | 230 N |
| 0.3 mm/tooth | 135 N | 320 N |

Thus, the cutting inserts according to the invention exert a considerably lower axial force, which is very essential for the machining of thin-walled work-pieces in order to avoid vibrations, and yielding (flexing) of thin-walled parts.

Both embodiments according to the invention (i.e., on one hand the embodiment according to FIGS. 1 to 3 and on the other hand the one according to FIGS. 4 to 6) contribute to considerably less edge chippings. Further, the embodiment according to FIGS. 1 to 3 produces somewhat smoother surfaces than the embodiment according to FIGS. 4 to 6, while the latter influences more advantageously on the decrease of the tool's axial pressure against the workpiece. Thanks to these somewhat differentiated properties of the two embodiments, a milling tool may advantageously be provided with both types of cutting inserts, whereby the beneficial effects of both cutting inserts are realized simultaneously. In order to optimize the beneficial properties of the two types, the proportion between the numbers of the two types may be varied. Tests have shown that the number of cutting inserts according to FIGS. 4 to 6 preferably should exceed the number of inserts according to FIGS. 1 to 3. In particular, the number of cutting inserts according to FIGS. 4 to 6 should be more than four times more than the number of inserts according to FIGS. 1 to 3. Particularly for thin-walled work-pieces, such a proportion has given very good results.

I claim:

1. A double-sided milling insert of generally rectangular shape, comprising:

first and second substantially similar main surfaces and four side surfaces interconnecting the first and second main surfaces;

a first pair of the side surfaces being opposed relative to one another and each forming an acute angle with the first main surface, and an obtuse angle with the second main surface;

a second pair of the side surfaces being opposed relative to one another and each forming an obtuse angle with the first main surface, and an acute angle with the second main surface;

the first main surface including a planar support face, four cutting corners, and a pair of first and second beveled faces disposed in each cutting corner, each of the first and second beveled faces being angled relative to a plane of the first main surface, the first beveled face being disposed closer to a respective cutting corner than is the second beveled face, the first beveled face bordering one of the second side surfaces and intersecting one of the first side surfaces to form a secondary cutting edge therewith, the second beveled face bordering the first beveled face and intersecting the same first side surface as the first beveled face to form therewith a main cutting edge, the second main surface including a planar support face, four cutting corners and a pair of first and second beveled faces disposed in each cutting corner, each of the first and second beveled faces of the second main surface being angled relative to a plane of the second main surface, the first beveled face of the second main surface being disposed closer to a respective cutting corner than is the second beveled face of the second main surface, the first beveled face of the second main surface bordering one of the first side surfaces and intersecting one of the second side surfaces to form a secondary cutting edge therewith, the second beveled face of the second main surface bordering the first beveled face and intersecting the same second side surface as the first beveled surface to form therewith a main cutting edge.

2. The insert according to claim 1, wherein the first main surface includes a pair of first lands extending along respective ones of the first side surfaces that form the acute angle with the first main surface, each of the first lands being disposed between the second beveled faces of two cutting corners; each of the first lands intersecting the respective first side surface to form therewith a land cutting edge; the second main surface including a pair of second lands extending along respective ones of the second side surfaces that form the acute angle with the second main surface; each of the second lands being disposed between the second beveled faces of two cutting corners, each of the second lands intersecting the respective second side surface to form therewith a land cutting edge.

3. The insert according to claim 2, wherein the first main surface includes two pairs of first lands, each pair extending along a respective one of the first side surfaces that form an acute angle with the first main surface; each of the pairs of first lands being disposed between the second beveled faces of two cutting corners; each of the pairs of first lands intersecting the respective first side surface to form therewith two land cutting edges; the second main surface including two pairs of second lands, each pair of second lands extending along a respective one of the second side surfaces that form the acute angle with the second main surface; each of the pairs of second lands being disposed between the second beveled faces of two cutting corners; each of the pairs of second lands intersecting the respective second side surface to form therewith two land cutting edges.

4. The insert according to claim 3, wherein the lands of each pair of first lands are spaced apart to form a middle face therebetween; the lands of each pair of second lands are spaced apart to form a middle face therebetween.

5. The insert according to claim 2, wherein each land is convexly curved.

* * * * *